A. P. HOCHSTEIN.
MAGNIFYING GLASS.
APPLICATION FILED JULY 30, 1917.
1,285,177.
Patented Nov. 19, 1918.
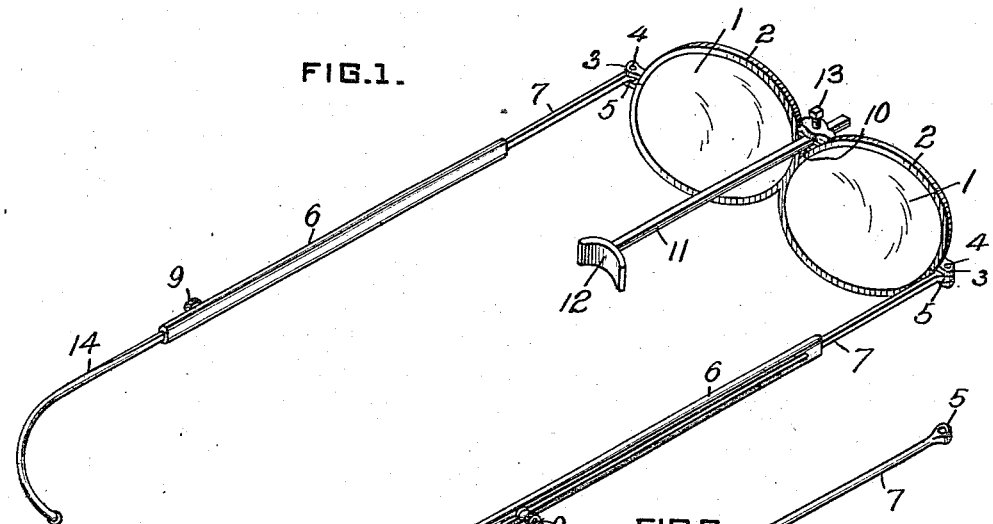
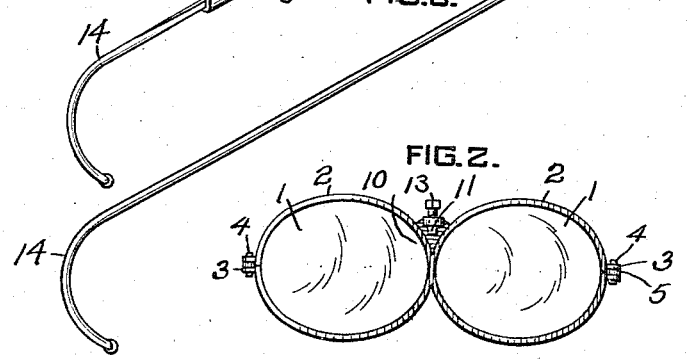
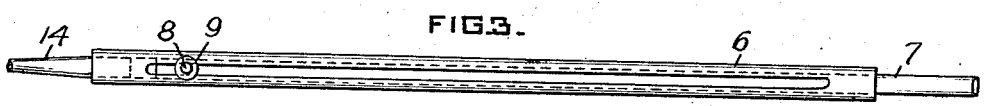
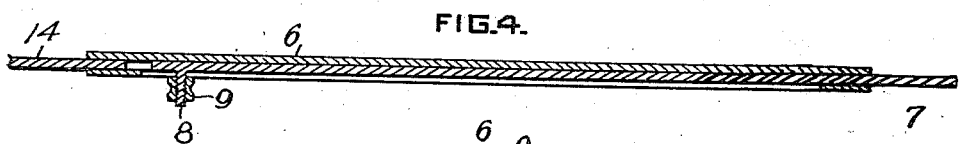
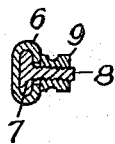
WITNESSES
J. Herbert Bradley
Jo. Baily Brown
INVENTOR
Alfred P. Hochstein
by Fred'k W. Winter
his attorney

UNITED STATES PATENT OFFICE.

ALFRED P. HOCHSTEIN, OF PITTSBURGH, PENNSYLVANIA, ASSIGNOR OF ONE-HALF TO EDWARD J. DALTON, OF PITTSBURGH, PENNSYLVANIA.

MAGNIFYING-GLASS.

1,285,177.

Specification of Letters Patent.

Patented Nov. 19, 1918.

Application filed July 30, 1917. Serial No. 183,607.

*To all whom it may concern:*

Be it known that I, ALFRED P. HOCHSTEIN, a resident of Pittsburgh, in the county of Allegheny and State of Pennsylvania, have invented a new and useful Improvement in Magnifying-Glasses, of which the following is the specification.

This invention relates to magnifying glasses.

The object of the invention is to provide such a glass in a form that for many purposes and uses will be much more convenient, effective and time saving, and a less strain on the eyes, than magnifying glasses as ordinarily constructed.

Generally stated, the invention comprises magnifying glasses in which the lenses are mounted in the same manner as in ordinary spectacles, but with the frame, temples and nose-piece so constructed as to hold the lenses a considerable distance from the eyes, and preferably so as to allow for adjusting the lenses toward and away from the eyes. This construction, when properly focused, makes the two lenses appear as one magnifying lens with a wide scope of vision.

The invention comprises the construction and arrangement of parts hereinafter described and claimed.

Figure 1 is a perspective of the entire device, having adjustable nose piece and temples; Fig. 2 is a front elevation; Fig. 3 is an enlarged side elevation of a portion of a temple; Fig. 4 is a horizontal section through Fig. 3; Fig. 5 is an enlarged sectional view of the temple adjusting means; and Fig. 6 is a view of a plain non-adjustable temple.

In the drawings the lenses are shown at 1. These are shown as oval and of ordinary spectacle size, but obviously may be of any desired size or shape, such as round, square, oval or other shape. The lenses are mounted in a frame 2 of the same general construction as ordinary spectacle frames, except that there is no intervening nose piece. It is necessary that the lenses be set as close together as possible. Hence the two frame members connect directly in a manner to allow the two lenses to practically abut. The outer sides of the frame members have the usual ears 3 for receiving screws 4 for clamping the lenses in the frame, and also serving as pivots for the temples 5, in the manner usually employed in folding spectacles.

The temples 5 may be constructed like ordinary spectacle temples, except much longer, as shown in Fig. 6,—sufficiently long to hold the lenses several inches from the eyes,—say from 2 to 4 inches, more or less. Preferably, however, they will be adjustable in length so as to permit the lenses being held at various distances from the eyes. One arrangement for permitting such adjustment of the temples is shown in the drawings and consists in making the temple in two telescoping parts. As shown, one member 6 is substantially a flattened thin walled metallic tube, and the other member 7 is a flat strip telescoping in the tubular member, which is slotted lengthwise, or at least cut away at one edge, to allow the passage of a threaded clamping stud or screw 8 having a knurled nut or head 9 and which will compress the sides of the member 6 to frictionally clamp the member 7 in any adjusted position.

In order to hold the glasses at a distance from the eyes, it is necessary to have a projecting nose piece. As shown, the upper angle between the frame members 2 is filled in with metal, as at 10, and to this is secured a bar 11 of suitable length and which at its outer end is provided with a suitable curved piece 12 adapted to bear on the bridge of the user's nose. The bar 11 can be secured to the frame in any suitable way. When the temples are non-adjustable, as in the less expensive form shown in Fig. 6, this bar can be conveniently fastened to the frame so that it can be removed when the glasses are folded to be put away. When the temples are adjustable in length, the bar 11 is also made adjustable. One way of accomplishing this is shown in the drawings and consists in providing the part 10 with a opening through which the bar 11 can slide, and securing it therein by means of a small set screw 12. Various other arrangements will suggest themselves for adjusting both the nose piece and the temples.

The glasses are used in the manner of ordinary spectacles. The long temples and the projecting nose piece hold the lenses a considerable distance away from the eyes and in the desired proximity to the work or object to be viewed. By having the temples and nose piece extensible, the distance of the lenses away from the eyes can be varied to suit individual eyes or to suit any particular kind or range of work.

The glasses described are usable as reading glasses and especially for the use of jewelers, engravers, gem setters, diamond cutters, dentists, surgeons, physicians, oculists, optometrists, botanists, or other persons who must examine minute objects which need to be magnified. They have many advantages over the magnifying glasses ordinarily used for these purposes. The following advantages are apparent: The user cannot get in his own light,—the light being all around him; the user does not need to sit in a crouched, stooping, unhealthy position; he has both hands free for his work or for holding the book or object being examined; he can look up or down instantly without having to remove the glasses from his eyes—and hence can instantly see a person or locate a tool, screw or the like, without shifting his position, and quickly return to his work without having to adjust or replace the glasses; and he does not need to close one eye and hence there is no strain put on one eye only.

The lenses can be made to suit individuals. If desired, they can be bi-focal, or the user can place his own ordinary glasses in position upon his nose in conjunction with the magnifying glasses without interference or inconvenience. The glass is adjustable for any range of work. It can be folded quickly and carried in a flat case, or in the pocket. It is very light and not tiresome to the user. It will remain adjusted without inconvenience to or interference with the user in his ordinary occupation.

What I claim is:

1. A magnifying glass comprising a lens holding frame, consisting of two rims joined together at one edge, a pair of temples attached to the rims, and a horizontally elongated nose piece connected to the rims at their junction.

2. A magnifying glass comprising a frame for holding a pair of lenses substantially in contact, temples connected to the frame, means to adjust the length of said temples, and an elongated nose piece connected to the frame at the point of contact with the lenses and held in substantially parallel relation to the temples.

3. A magnifying glass comprising a rigid lens holding frame consisting of two rims attached together at one point, a nose piece horizontally adjustably mounted between the rims, and temples attached to the rims, said temples having means to adjust their length, and to hold them in such adjusted position.

4. In a magnifying glass comprising two lenses carried in a frame comprising two lens holding rims joined together at a point of contact, a nose piece, a bar carrying said nose piece and slidably mounted in the frame at the point of contact of the lens carrying rims whereby to adjust the distance of the lenses from the nose piece, and means to lock the bar carrying the nose piece in adjusted position.

In testimony whereof, I have hereunto set my hand.

ALFRED P. HOCHSTEIN.